United States Patent [19]

Waldstädt

[11] Patent Number: 5,369,933
[45] Date of Patent: Dec. 6, 1994

[54] APPARATUS FOR FOLDING IN THE BOTTOM OF A CARDBOARD PACK

[75] Inventor: Manfred Waldstädt, Mainz, Germany

[73] Assignee: Tetra Alfa Holdings S.A., Pully, Switzerland

[21] Appl. No.: 41,492

[22] Filed: Apr. 1, 1993

[30] Foreign Application Priority Data

May 1, 1992 [DE] Germany .............. 4214519

[51] Int. Cl.⁵ .................................. B65B 7/16
[52] U.S. Cl. .................. 53/375.9; 53/376.3; 53/484; 493/165
[58] Field of Search ............ 53/376.3, 373.7, 373.2, 53/374.7, 370.7, 375.8, 375.9, 371.7, 476, 484; 493/165

[56] References Cited

U.S. PATENT DOCUMENTS

| | | |
|---|---|---|
| 2,514,867 | 7/1950 | Howard et al. |
| 3,089,298 | 5/1963 | Neuendorf et al. ............ 53/374.7 X |
| 3,820,303 | 6/1974 | Martensson et al. ........... 53/375.9 X |
| 3,956,975 | 5/1976 | Egleston et al. ............... 53/375.9 X |
| 3,996,724 | 12/1976 | Smith .......................... 53/76 |
| 4,078,364 | 3/1978 | Schmidt ...................... 53/378.3 |
| 4,145,236 | 3/1979 | Meumayer et al. ............ 156/73.1 |
| 4,738,077 | 4/1988 | Wakbayashi et al. ........... 53/375 |

FOREIGN PATENT DOCUMENTS

| | | |
|---|---|---|
| 3322402 | 1/1985 | European Pat. Off. . |
| 0460844 | 12/1991 | European Pat. Off. . |
| 283978 | 1/1912 | Germany . |
| 1461787 | 7/1963 | Germany . |
| 1461867 | 9/1969 | Germany . |
| 1803797 | 10/1970 | Germany . |
| 2536973 | 3/1976 | Germany . |
| 2812138 | 9/1979 | Germany . |
| 2924776 | 4/1981 | Germany . |
| 3204773 | 8/1983 | Germany . |
| 3818910 | 6/1988 | Germany . |
| 3805050 | 10/1988 | Germany . |
| 3934560 | 10/1989 | Germany . |
| 2017041 | 10/1979 | United Kingdom . |

Primary Examiner—James F. Coan
Attorney, Agent, or Firm—Biebel & French

[57] ABSTRACT

A description is given of an apparatus for folding in the front face of a pack (1, 1') made of cardboard coated with plastics material, the front face of which pack is quadrangular in the plan view in the folded in condition and has a transverse sealing seam (5) which can be folded over, having a fold member (b) and a companion fold member (a), which are both driven movably along specific paths of movement by at least one lever mechanism (8-13), and amongst which a conveyer is arranged at a spacing away in the Y-extent, which conveyer moves the packs (1, 1') in the X-extent, wherein the Y-axis is vertical to the X-axis and the zero point of the axes (X, Y) is disposed in the end fold position of the two fold members (a, b) so that the bottom of a pack can be folded in one single step without any subdivision into pre-folding and re-folding steps, and so that no component parts of the machine engage in the pack, preferably not even over the open pack, it is provided that a Y-Z-plane extending in the Z-extent is disposed in the Y-axis and is intersected vertically by the X-axis, that the paths of movement of both fold members (a, b) extend symmetrically to each other relative to the Y-Z-plane, wherein the paths of movement in the X-Y-plane is described as a superposing of a translatory movement and a rotational movement of the respective fold member, that each fold member (a,b) is secured to a connecting lever (12) which is driven in a controlled manner, that arranged symmetrically to the zero point of the two axes (X, Y) is a centering device for the pack, and that the space for the folding in device is free of structural components above the centering device.

10 Claims, 6 Drawing Sheets

Fig.8

APPARATUS FOR FOLDING IN THE BOTTOM OF A CARDBOARD PACK

BACKGROUND OF THE INVENTION

1. Field of the Invention

The invention relates to an apparatus for folding in a front face of a pack made of cardboard material coated with plastics material, the front face of which pack when folded in is substantially quadrangular in the plan view and has a transverse sealing seam which can be folded over, having a fold member and a companion fold member which are both driven movably along specific paths of movement by means of at least one lever mechanism and amongst which a conveyer is arranged at a spacing away in the Y-extent, which conveyer moves the packs in the X-extent, wherein the Y-axis is vertical to the X-axis and the zero point of the axes is disposed in the end fold position of the two fold members.

2. Description of the Related Art

As known, packs made of coated cardboard have a substantially tubular main body with front faces at the ends. Usually, the one front face is the lid and the other front face is the bottom. At least one of the two front faces, e.g. the bottom, is substantially quadrangular in the plan view in the folded in condition of known packs. With other packs, the lid is provided with a so-called gable type closure which is also quadrangular in the plan view. It is also possible to fold over the gable closure so that it is flat and so that this front face on the lid side is vertical to the tube walls. With this invention whether the front face is a lid or a bottom is immaterial.

A folding in apparatus is also known similar to the kind mentioned in the introduction, wherein the front face is a lid. The web of material of the pack which is to be closed is circular, and there are various fold- and weld stations along the circular web. Each fold station has a fold member and a companion fold member which both travel about axes on part circular paths, these axes being disposed approximately in the radial extent relative to the revolving assembly. It has been shown that the Front walls which have to be folded must be pre-folded first of all, because otherwise the folding in along the circular paths does not fold the front face accurately. The known folding in device thus only produces re-folding, and the gable surfaces are also pressed inwardly and are folded inwardly.

The known apparatus is complicated, expensive and prone to malfunctions due to the design of the revolving body and due to the plurality of fold stations.

In addition, the filled and upwardly open packs travel beneath a number of movable parts with the known machine, particularly in the fold station, so that foreign bodies from overlying structural components are able to fall into the open pack. This causes cleaning- and hygiene-related problems.

SUMMARY OF THE INVENTION

The aim of the invention therefore is to create a folding in apparatus of the kind mentioned in the introduction wherein the front faces, e.g. the bottom of a pack, can be folded in in one single step without any division into a pre-folding operation and a subsequent re-folding operation. During the folding operation, none of the parts should engage in the pack, preferably not even structural components over the open pack, and shortly afterwards sealing should be effected in the fold position.

This problem is solved according to the invention in that a Y-Z plane extending in the Z-extent is disposed in the Y-axis and is intersected vertically by the X-axis, that the paths of movement of both fold members extend symmetrically to each other relative to the Y-Z-plane, wherein the paths of movement in the X-Y-plane are described as the superposing of a translatory movement and a rotational movement made by the respective fold members, that each fold member is fixed to at least one connecting lever which is driven in controlled fashion, that arranged symmetrically to the zero point of the two axes is a centering device for the pack, and that the space for the folding in device is free of structural components over the centering device.

The entire folding in apparatus according to the invention can preferably be used for folding in the bottom of a pack, and for this reason the description is firmly related to a bottom, but the lids can also be designed in this way. A bottom of this kind is substantially quadrangular in design in the plan view in the folded in condition, and may even be flat. In the case of a bottom, this is important so that the pack has a good basis.

The series of filled packs which have the open bottoms upwards is guided at least in the fold region of the apparatus according to the invention a little way onto a straight belt in the X-extent. Expediently, the X-extent is horizontal. A Z-extent can be imagined as extending vertically thereto which is also disposed horizontally. A Y-axis can also be imagined for the spatial ratio which is vertical to the other two axes. According to the invention, a zero point is defined where the three axes intersect and where a Y-Z plane is supposed as existing which is intersected vertically by the X-axis. The first teaching of the invention in solving the afore-mentioned problem is that the paths of movement of both fold members should extend symmetrically to each other relative to the Y-Z-plane. The zero point therein is the end point where the two fold members touch when folding in of the bottom is complete, with the end of the paths of movement also being disposed at that place.

The start of the paths of movement is also above and outside the two sides at a spacing from the Y-Z-plane, since the starting-, zero- or rest positions are disposed there both for the fold member and for the companion fold member.

If a vertical plane is imagined as being disposed centrally through the pack in a vertical direction to its direction of conveyance in the X-axis, then the central plane of the open pack must be disposed in the Y-Z-plane at the latest at the moment when the frontmost edges of the fold member and companion fold member just start to touch the bottom which is not yet folded in.

Each path of movement of the fold members represents a superposing of a translatory movement and a rotational movement of each of the fold members, i.e. the fold members are not rotated about fixed axes, and are not even moved simply in a straight line. Instead, it is provided that each fold member is fixed to a connecting lever which is controlled and driven in a specific way so that they are moved towards the bottom which is still open and which has to be folded in, and folded in accurately without any pre-folding.

It has been shown that even when the fold members have very accurate paths of movement, the bottom cannot be folded along the junction fold lines, only along these lines which are disposed at the tube end of the pack and which represent the boundary at the front face fold region, so to say. Often, undesirable buckled folds have been noted which also extend beneath the junction fold line into one or more tube walls.

Therefore, according to the invention, it is also provided that a centering device be disposed symmetrically to the zero point, into which apparatus the pack is introduced and supported during the folding operation.

By virtue of the afore-mentioned features according to the invention, the front wall in question is folded in correctly, whether this front wall be the bottom or the lid, without the front face fold members having to be pre-folded. Furthermore, the gable surfaces are folded out in the Z-extent. The corner points of the afore-mentioned junction fold line are not disposed on a circle, and due to the combination of translatory and rotational movement the fold members according to the invention inevitably cause the bottom of the pack which has not been prefolded to be folded in the desired and correct way. Hygiene-related problems are considerably improved since none of the structural parts are disposed in the spatial area of the folding in device over the centering device, and thus over the pack which is still open. Despite the fact that only one single step is needed for the pre-folding operation to produce correct folding of the front wall, none of the parts of the machine engage into the pack. Since only one fold member and one companion fold member are provided which prepare the folding operation whereupon a sonotrode can be used, for example, to weld the transverse sealing seam, not only are the risks from foreign bodies reduced, but the apparatus also has fewer parts and thus operates more reliably.

The connecting levers driven in controlled manner represent the components of a link rod system which accurately monitors and determines the sequence of movement made by the components spatially over the passage of time.

It is particularly preferable according to the invention if each path of movement in the initial region extends at an angle of less than 45°, preferably less than 30°, relative to the X-axis, and extends in the end region at an angle of more than 45°, preferably more than 60° relative to the X-axis. The initial region is thus disposed at the maximum distance away from the zero point, and here the fold members move flatter than in the end region where they move more steeply into a position towards the end fold position with the bottom parts of the packs which are to be folded.

Therein, according to the invention, it is particularly advantageous if each path of movement, has a continuous transition between the initial region and end region. Folding can be done properly and accurately, if two straight paths are not adjacently disposed making a transition into each other by way of a buckled point, but if the path of movement is steady and thus has a gradually changing inclination, with each path of movement being rounded, so to speak.

More accurate investigation has led to the result according to the invention such that the problem is solved particularly well and correctly if the path of movement of the fold member in the first quadrant in which the x-values on the X-axis and also the y-values on the Y-axis are positive extends in a specific region of flatness which is defined by two curves. Here, in the first quadrant, by way of example, the lower boundary curve is called $y_1 = f_1(x)$, and the upper boundary curve is called $y_2 = f_2(x)$ with $$f_1(x) = a_1 + b_1 x - c_1 x^2 + d_1 x^3 - e_1 x^4 + g_1 x^5$$

and $$f_2(x) = a_2 + b_2 x - c_2 x^2 + d_2 x^3 - e_2 x^4 + g_2 x^5$$

In the second quadrant, for positive y-values in the Y-extent and negative x-values in the left negative extent of the X-axis, the path of movement should extend in a region of flatness which is also defined by two other curves which are called $$f_3(x) = a_1 + b_1 x - c_1 x^2 + d_1 x^3 - e_1 x^4 + g_1 x^5$$

$$f_4(x) = a_2 + b_2 x - c_2 x^2 + d_2 x^3 - e_2 x^4 + g_2 x^5$$

wherein
$a_1 = -135,006$
$b_1 = +23,452$
$c_1 = +1,398$
$d_1 = +0,041922$
$e_1 = +6,183 \times 10^{-4}$
$g_1 = +3,571 \times 10^{-6}$
$a_2 = +17,312$
$b_2 = +2,002$
$c_2 = +0,213$
$d_2 = +1,355 \times 10^{-2}$
$e_2 = +4,022 \times 10^{-4}$
$g_2 = +4,386 \times 10^{-6}$.

It has been found that folding cannot be done completely if the front edges of the fold member and of the companion fold member do not extend in the aforementioned surfaces.

However, on the other hand, the folding in operation is particularly favourable if the path of movement of the frontmost edge of the respective fold member which comes into engagement with the fold lines of the bottom wall which is to be folded in follows a specific curve definition, i.e. a specific path of movement $f_a(x)$ in the first quadrant and $f_b(x)$ in the second quadrant. Both curves are composed computationally of two partial curves, namely, for the first quadrant, a curve $y_{a6} = f_{a6}(x)$ from the domain of definition $D_1$; and a second partial curve $y_{a7} = f_{a7}(x)$ for the domain of definition $D_2$, which curve extends towards the region of initial movement. Therein, according to the invention:

$$f_{a6}(x) = -a_3 + b_3 x - c_3 x^2 + d_3 x^3 - e_3 x^4$$

for $D_1\{x/0 \leq x \leq 6\}$, and $$f_{a7}(x) = a_4 + b_4 x - c_4 x^2 + d_4 x^3 - e_4 x^4$$

for $D_2\{x/6 \leq x \leq 40\}$.

For the second quadrant, thus for positive y-values and negative x-values, the path of movement is correspondingly composed of the curve $y_{a8} = f_{a8}(x)$ (in the end region) and $y_{a9} = f_{a9}(x)$ (in the initial region). Therein:

$$f_{a8}(x) = -a_3 - b_3 x - c_3 x^2 - d_3 x^3 - e_3 x^4$$

for $D_3\{x/-6 \leq x \leq -0\}$, and $$f_{a9}(x) = a_4 - b_4 x - c_4 x^2 - d_4 x^3 - e_4 x^4$$

for $D_4\{x/-40 \leq x \leq -6\}$, wherein
$a_3 = 8,7013$
$b_3 = 14,224$
$c_3 = 3,4512$
$d_3 = 0,40883$ $e_3 = 0,017696$
$a_4 = 10,216$
$b_4 = 1,5685$
$c_4 = 0,046046$
$d_4 = 0,68195 \times 10^{-3}$
$e_4 = 0,39415 \times 10^{-5}$.

For the regional values $D_1$ to $D_4$ it can be supposed that for x the millimetre values of a pack for liquids can be used. For example, the width of the bottom of a pack in the plan view, viewed in the Z-extent, is 70 mm.

Therefore, it is expedient if according to the invention it is provided that the length of each path of movement in the X-extent is somewhat greater than, or equal to, half the length of the bottom in the X-extent.

Also, according to the invention it is provided that the centering device has two parallel centering bars which are at a spacing apart and which extend in the direction of conveyance of the pack, wherein the spacing between them is measured in the Z-extent. These two elongate centering bars have sharp edges over which the afore-mentioned lower junction fold lines are disposed beneath the parts of the gable wall regions which are to be folded outwardly, so that the junction fold line disposed on the gable surface is buckled with the aid of the respective centering bar, and it is ensured that the upper peak of the gable moves outwardly in the Z-extent.

This means that advantageously in the sides which are transverse to the longitudinal extent of the centering bars, i.e. in the side walls which are parallel to the Y-Z-axis, the tension is increased, so that when folding takes place along the end fold line, a neater inward fold of the bottom closure is produced. The centering bar ensures that during the folding together operation, the gable walls are actually folded outwardly in the Z-extent. Without these centering bars, falling or folding to the inside could happen. Therefore, the centering device advantageously provides for secure and proper folding, even if the impressions made in the end face region of the pack, e.g. the impression made in the bottom region, is somewhat weaker than is ideal. A weaker impression means that costs can be cut.

Therein, it has been shown to be particularly advantageous if according to the invention the ratio of the spacing between the centering bars and the width of the pack in the Z-extent transversely to its direction of conveyance is 095. This produces the neatest folding and the best increase in tension in the tube walls which ape not supported by abutment members.

The apparatus according to the invention is also characterised in that the connecting lever of the companion fold member is connected at a first point of rotation to one end of an output fold guide rod which is mounted at the opposite end at a stationary point of rotation and is connected to a drive cam at a second point of rotation, the drive cam being secured to a toothed drive wheel which is in meshing engagement with the toothed drive wheel of the other connecting lever such that the Y-Z-plane is vertical to the connecting line of the points of rotation of the toothed wheel. Thus it is possible to move both the fold member and also the companion fold member synchronously to each other on the desired paths, and to keep the lever outside the region above the path of movement of the open packs, preferably arranged in outwardly displaced fashion in the +Z or −Z-extent.

It is also expedient according to the invention if the fold member extends at the front so that it tapers in its cross-section into the shape of a panel, and if the companion fold member is in the form of an anvil against which a sonotrode can be pushed in a path of movement which is preferably different in time and/or place from the path of movement of the fold member. With reference to the paths of movement and functions, it has already been stated that the actively folding edges of the companion fold member, on the one hand, and of the fold member, on the other hand, should move in the domains of definition, and therefore it is expedient if the fold member is designed in such a way that it tapers at the front into a panel which has a straight blade-fine pressure- and fold edge. A fold member of this kind could also be referred to as a folding metal sheet, and it fulfills its function completely and allows space for a sonotrode to be introduced which also rests on the companion fold member and can be used for welding purposes, since the companion fold member is in the form of an anvil. The anvil is a clean structural unit which is completely smooth on the outside, so that the upwardly open pack can even move beneath the anvil, without the afore-mentioned problems of foreign bodies occurring. The anvil and the like are thus placed outside the path of movement of the open packs.

Further advantages, features and possible applications of the present invention will emerge from the following description of a preferred embodiment, in conjunction with the drawings, wherein:

BRIEF DESCRIPTION OF THE DRAWINGS

FIG. 2 is a very similar illustration, wherein, however, a different operational state is shown, wherein the front engagement edges of the folding metal sheet and of the anvil have already folded in more than half way the front face of the pack which is being folded in.

DESCRIPTION OF THE PREFERRED EMBODIMENT(S)

Three packs 1 or 1' are disposed above a conveyor belt, not shown, which moves horizontally in the positive extent X, wherein the pack 1' is already ready and folded and is provided with a welded transverse sealing seam. With the embodiment shown here, the lid of the pack is provided at the bottom, and the pack is filled through the bottom, and the front face walls are thus the bottom walls which are separated from the tube side walls by the junction fold line 2. The junction fold line 2 extends in the X-extent, whilst in FIG. 5 the junction fold line 2' extends in the Z-extent. The Z-extent is vertical to the plane of the paper in FIGS. 1 to 4 and 7, 7a.

Figure 5:
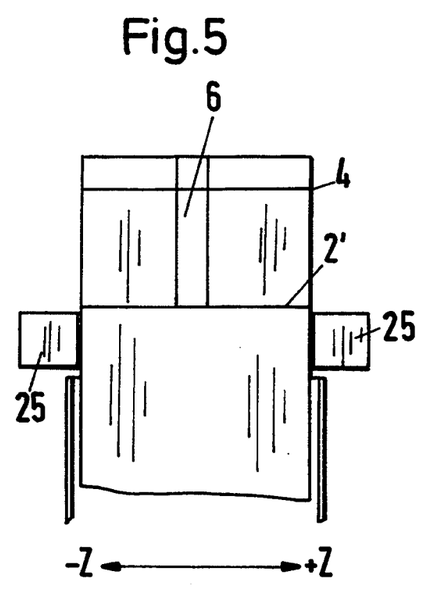
FIG. 5 is a view of an illustration according to FIG. 4, from right to left, in the direction of the arrow V, i.e. viewed in the X-extent.

The triangular gable faces are denoted by the reference numeral 3 and at the top, on the outside, they have a peak 4 which is disposed opposite the junction fold line 2 and which is supposed to be folded out in the Z-extent or -Z-extent (FIG. 5). The pack 1' is in a condition where the folding operation has been completed, so that the peak 4 of the gable can be seen directly beneath the transverse sealing seam 5. The longitudinal sealing seam of the pack is denoted by the reference numeral 6 in FIG. 5.

Figure 1:
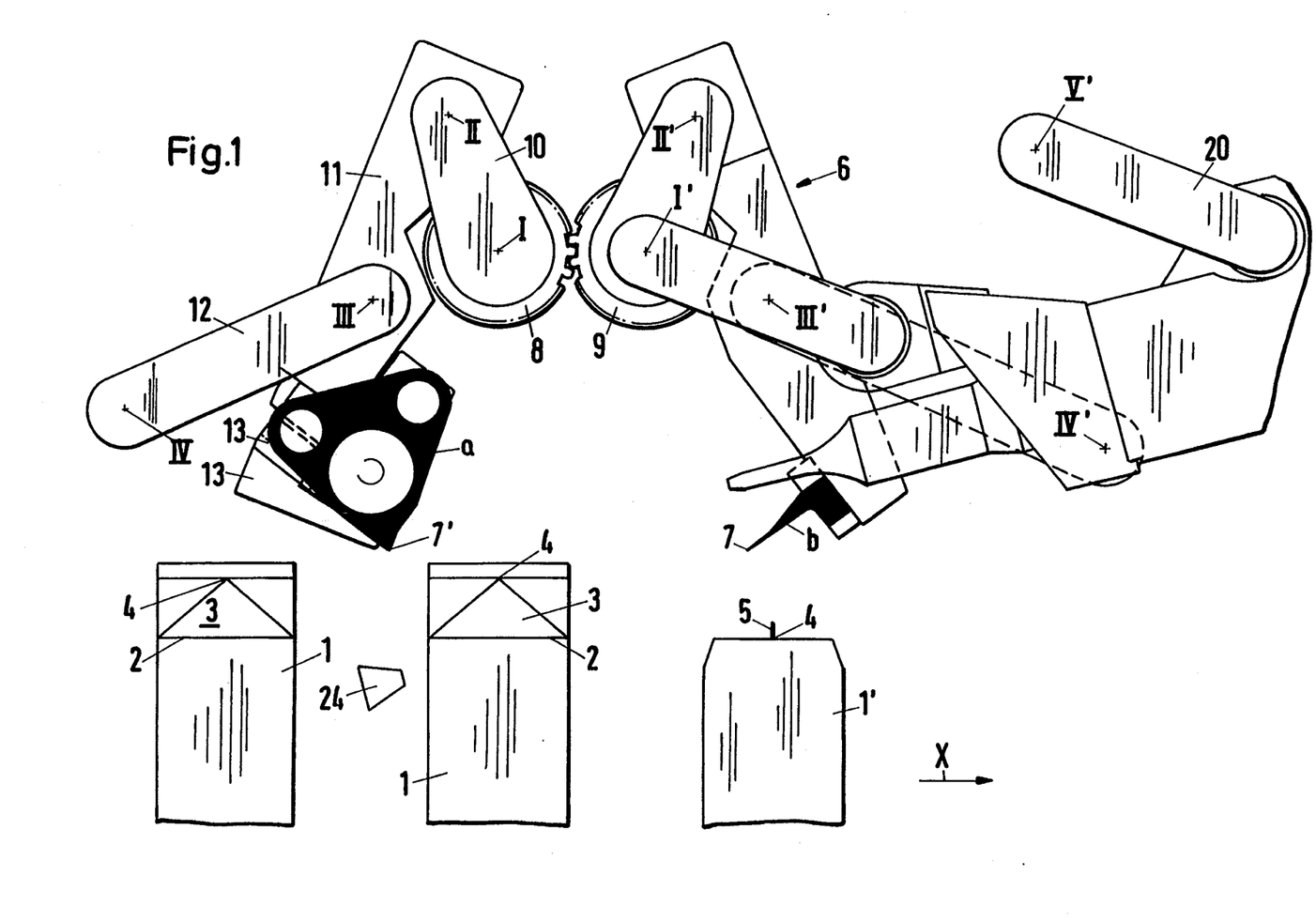
FIG. 1 is a partly broken away illustration of the folding in device with the folding metal sheet b as the fold member, the anvil a as the companion fold member, the drive gear system, the sonotrode and three packs conveyed therebeneath from left to right in the X-extent.

So that the front face 2-4 of the pack 1 can be folded in, the folding metal sheet b and the anvil a are moved by means of a lever mechanism denoted generally by the reference numeral 6 in such a way that the fold edges 7 of the folding metal sheet b and 7' of the anvil a move on predetermined curved paths. In FIG. 1, the folding metal sheet b and the anvil a are in the withdrawn position of rest, whence the fold edges 7, 7' can enter the initial region of the folding operation which is disposed in FIGS. 7 and 7a at a spacing from the zero point 0 at the outer end of the curves disclosed there.

For synchronous movement of the lever mechanism 6, a toothed drive wheel 8 and a toothed output wheel 9 in meshing engagement therewith are provided. A drive cam 10 which is fixedly connected to the toothed drive wheel 8 is pivotable about the stationary point of rotation I in such a way that at the outer end the drive cam 10 with point of rotation II can be moved on a circle to which the connecting lever 11 on the side of the anvil is hinged. This connecting lever is also hinged to the movable point of Potation III of a fold guide rod 12 on the anvil side, this fold guide rod being pivotable about the stationary point of rotation IV. This therefore promotes movement both of the support means 13 which is arranged fixedly on the connecting lever 11 and also of the anvil a which is held by the support means.

Disposed on the side of the folding metal sheet are similar components which are pivotable about the stationary axis of rotation I', the movable axis of rotation II', the movable axis of rotation III', the stationary point of rotation IV'and the stationary point of rotation V'.

Whilst the axes of Potation (points of rotation) of the components are best seen in FIG. 1, the components on the side of the folding metal sheet will now be described with the aid of FIG. 2.

An output cam 14 is fixedly connected to the toothed output wheel 9, the output cam driving the connecting lever 15, here on the side of the folding metal sheet, in the same way as on the anvil side, to the bottom end of which connecting lever the folding metal sheet b is secured. Here too a fold guide rod 18 is hinged at the movable point of rotation III', and is able to pivot about the stationary point of rotation IV'.

Independently of the movement of the output cam 14, a guide lever 17 is able to rotate about the point of rotation I' to which the sonotrode unit, generally denoted by the letter S, is hinged. The converter housing 19 of this latter is hinged parallel to the guide lever 17 for the sonotrode unit to a drive lever 20 which is also shown in FIG. 1 with its stationary point of rotation V.

The guide lever 17 for the sonotrode unit S and the drive lever 20 arranged parallel thereto can thus be moved separately by the output cam 14, moving in parallelogram fashion, the levers 20 and 17 being equal in length. It can thus be seen that the sonotrode unit S together with the sonotrode 21 can move and is driven separately by the folding metal sheet b.

Figure 2:
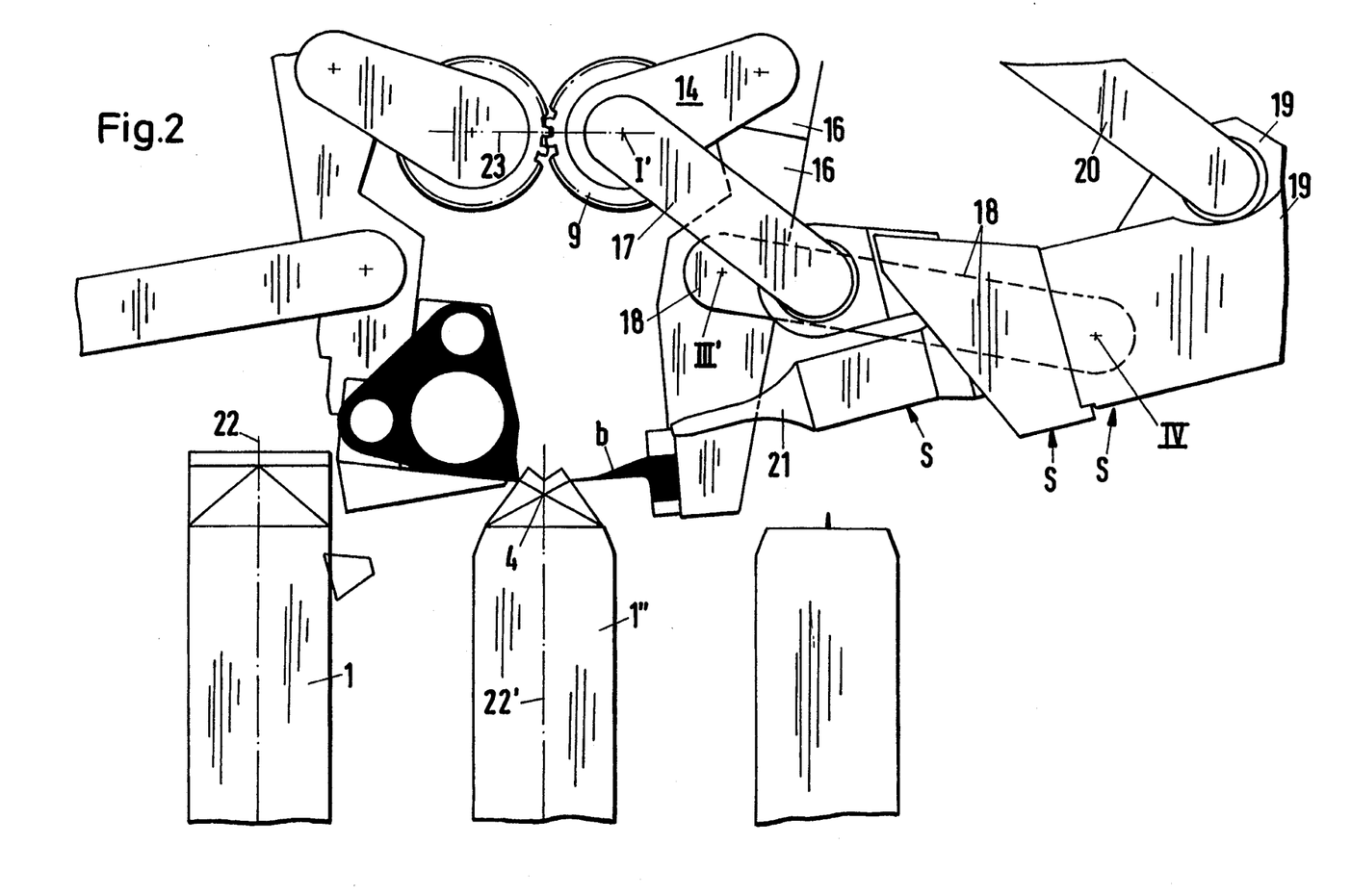
Figures 7, 7A:
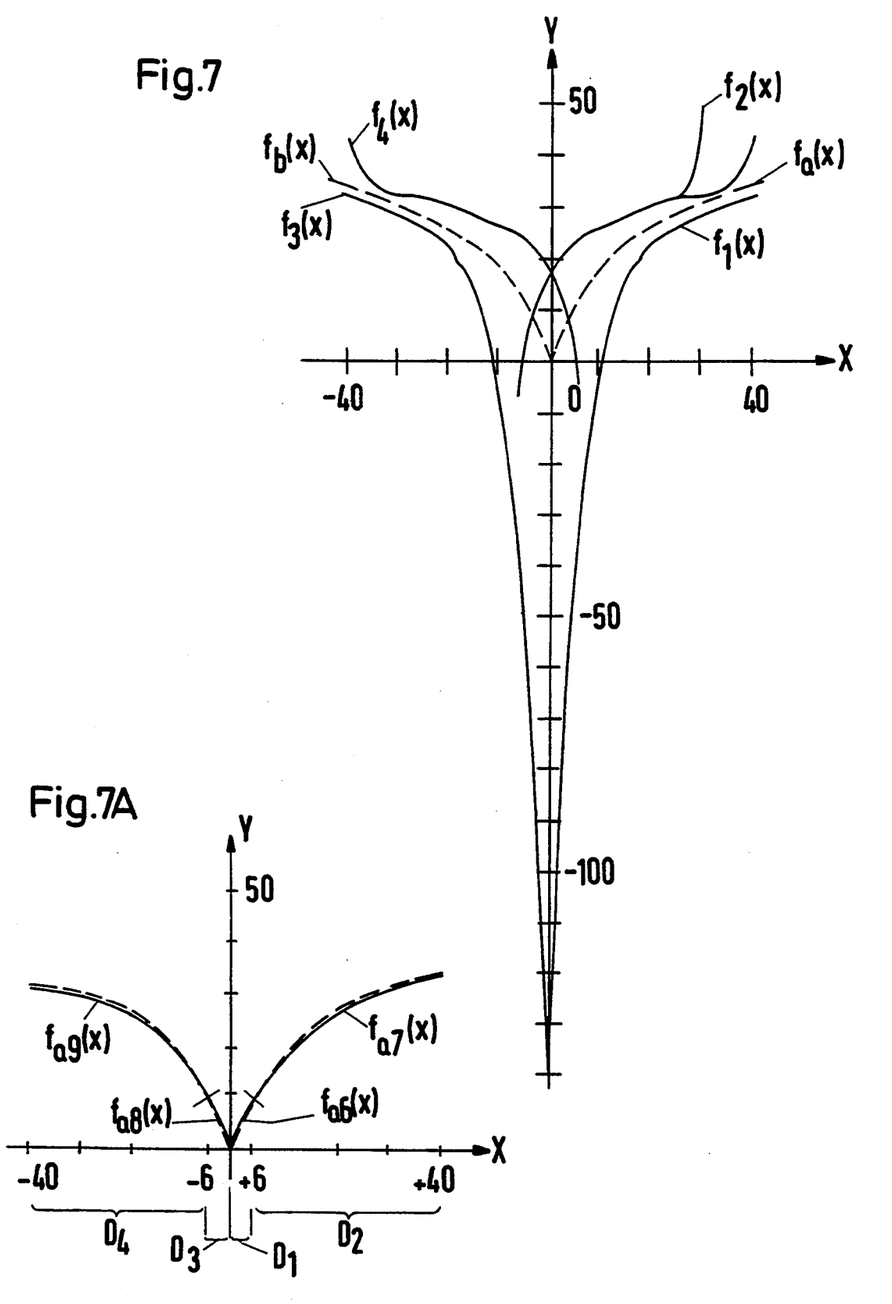
FIG. 7 shows the X-Y-axes with the zero point (0), the regions of flatness for the curves and the optimum paths of movement marked $f_a(x)$ and $f_b(x)$, wherein the Y-axis is to be imagined as passing through the centre of the pack, and the impressed lines of the pack bottom which is to be folded extend in the X-extent, which lines are shown in FIGS. 1 to 4.
FIG. 7a is a partial view of the first and second quadrants of the marked curves $f_a(x)$ and $f_b(x)$ which are each composed of two partial curves, with the domains of definition $D_1$ to $D_4$ given for them.

FIG. 2 shows the central pack 1" in an intermediate fold condition, wherein the front edges 7 and 7' of the folding metal sheet b and of the anvil a have already performed up to more than one half of the folding operation. For this reason, the peak 4 of the gable has already moved downwardly on the pack longitudinal central line 22' in comparison with the central line 22 of the pack 1. It will be appreciated that the longitudinal central line 22 of the pack moves with the pack. The central line 22' is disposed in the Y-Z-plane which goes through the zero point, as can be seen in FIG. 7. This central line 22' is also disposed in the Y-Z-plane which goes through the zero point, which plane is intersected vertically by the connecting line 23 between the points of rotation I, I' of the toothed wheel.

Figure 3:
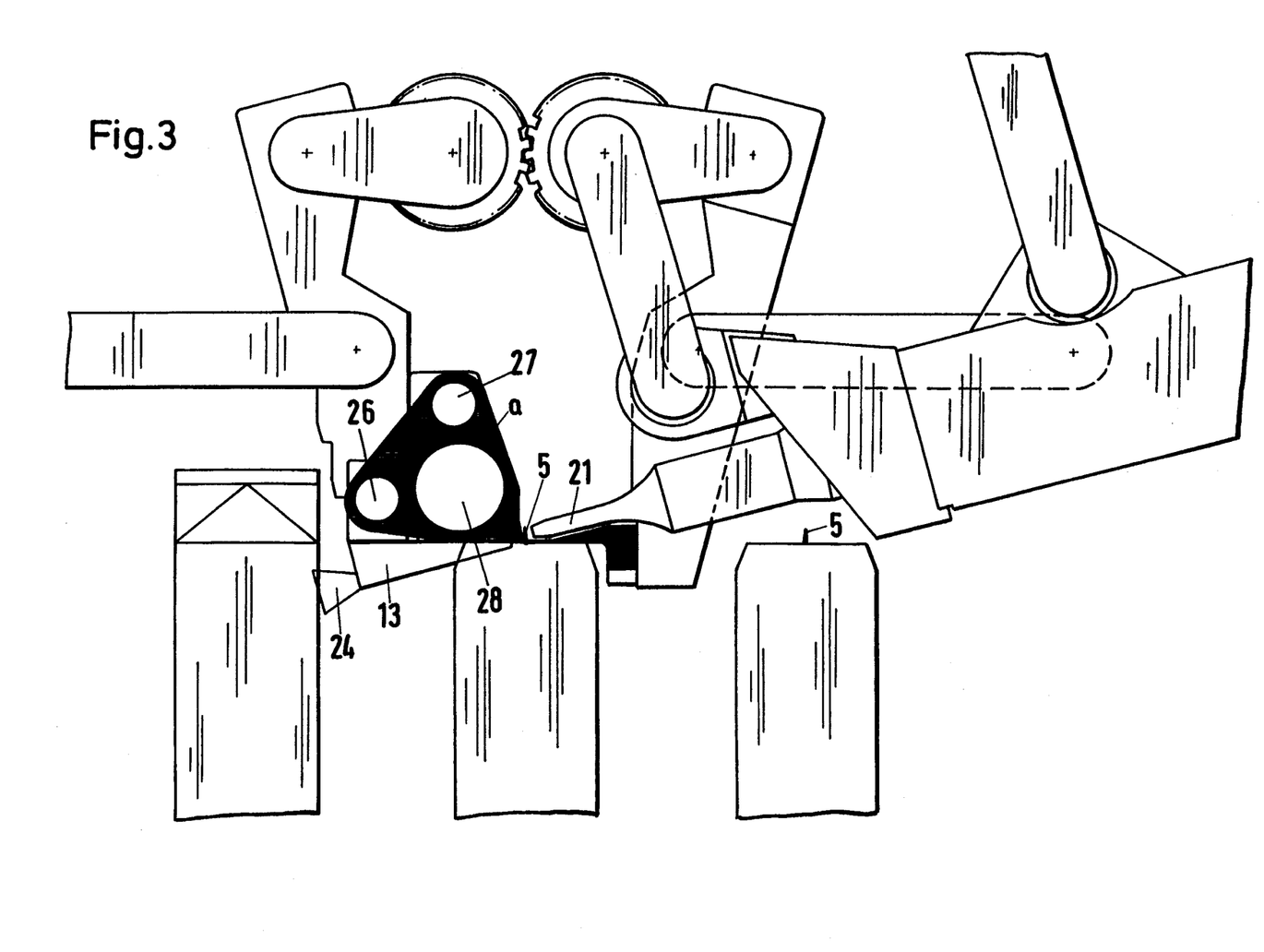
FIG. 3 is another similar side view, wherein a later operational state has been reached, wherein the sonotrode has also been moved close in front of the anvil.

In the state shown in FIG. 3, the folding operation has been brought to a close, and the support means 13 for the anvil a is placed on the stationary abutment 24, so that weld pressure can be properly and accurately resisted without any load from the connecting lever 11 and its mountings, this weld pressure being applied by the sonotrode 21 which can move away over the flat folding metal sheet b and can clamp and weld the transverse sealing seam 5.

Figure 4:
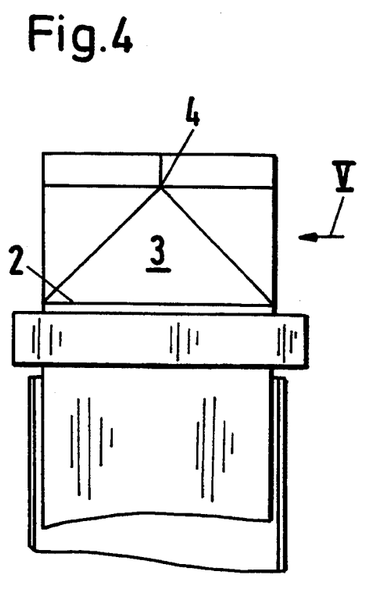
FIG. 4 is a side view of the centering device above a transportation container with upwardly projecting bottom wall regions which have to be folded, viewed in the Z-extent.

The two centering bars 25 are disposed in the region of the Y-Z-plane which passes through the zero point, but they are not shown in FIGS. 1 to 3 for the sake of simplicity. They are described with the aid of FIGS. 4 to 6. The elongate centering bars 25 which are viewed from the side and from above in FIGS. 4 and 6 respectively extend in the X-extent in which a view is taken in FIG. 5 from the first into the second quadrant, thus in the X-extent.

Figure 6:
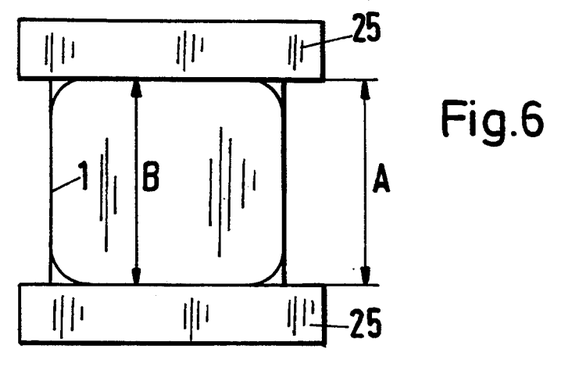
FIG. 6 is a plan view of the view in FIG. 4, without the transportation container and with rounded configurations in the region of the corners of the bottom which is to be folded.

The upper edge of the two centering bars 25 is arranged between 1 and 5 mm, preferably between 1.5 and 3 mm, beneath the junction fold line 2 between the tube of the pack, shown broken off at the bottom, and between the upper front face region 2, 4, 6. Also, the two centering bars 25 in FIG. 6 are at a specific spacing apart A, 67 mm for example, in one embodiment wherein the width B of the pack is 70 mm. Thus, the ratio V of the spacing A to the width B of the pack is 0.95. This means that when the pack 1 is introduced between the two centering bars 25 in the extent +X it is slightly compressed so that the actual width B of the pack between the centering bars is then likewise only 67 mm. The resultant advantageous increase in tension in the region of the junction fold line 2' (FIG. 5) have already been mentioned.

After the folding operation has been completed, the pack 1' leaves the centering bars 25.

FIG. 7 is a diagram of the X-Y-axes with the various curves which result for the paths of movement. The region of the third and fourth quadrants for all values $y<0$ is not of interest, and can therefore be disregarded in the description hereinafter, and this region is omitted and not shown in FIG. 7a.

FIG. 7 shows the zero point 0 at the point of intersection of the X and Y axes between the values $-40$ and $+40$ on the X-scale. By way of example, it is possible to imagine the numerical values as millimetres. The paper plane is set by the X- and Y-axis, and the Z-axis is vertical to the paper plane. Its origin is also the zero point 0. The zero point represents the end fold position where the front edges 7 and 7' of the folding metal sheet b and of the anvil a have reached the position in FIG. 3, the transverse sealing seam 5 thus being ready and folded. Therefore, this is the end region. The optimum paths of movement are shown by the curves $f_a(x)$ and $f_b(x)$ in FIG. 7. If these curves are followed from the zero point in an outwardly direction, their intermediate positions are passed through, as shown in FIG. 2, for example, for the folding metal sheet b and the anvil a. Still further to the outside, i.e. at a spacing from the Y- and X-axis, the broken line is reached in the starting region of the folding operation, which, with the drawing of the folding metal sheet b and the anvil a in FIG. 1 has already been passed since the front edges 7 and 7' are disposed there in a position of rest wherein they are not even in engagement with the pack. The pack therefore has not even moved to the correct position which is only reached by the pack in FIGS. 2 and 3.

The ideal paths of movement $f_a(x)$ and $f_b(x)$, i.e. the paths of the front edge 7 of the folding metal sheet b ($f_a(x)$ and in the second quadrant of the front edge 7' of the anvil a (path $f_b(X)$) are marked by broken lines by curves which move in FIG. 1 in a region of flatness. The region of flatness for the folding metal sheet b and thus the path of movement $f_a(x)$ is defined by the curves $y_1 = f_1(x)$ at the bottom and $y_2 = f_2(x)$ at the top, all in the first quadrant.

The path of movement $f_b(x)$ for the anvil extends in the second quadrant in a region of flatness which is defined by the curves $y_3 = f_3(x)$ and $y_4 = f_4(x)$.

Expressed in concrete numerical values, the defining curves are as follows:

$$y_1 = f_1(x) = -135{,}066 + 23{,}452x - 1{,}398x^2 + 0{,}041922 \cdot x^3 - 6{,}183 \cdot 10^{-4}x^4 + 3{,}571 \cdot 10^{-6}x^5$$

$$y_2 = f_2(x) = 17{,}312 - 2{,}002x - 0{,}213x^2 + 1{,}355 \cdot 10^{-2}x^3 - 4{,}022 \cdot 10^{-4}x^4 + 4{,}386 \cdot 10^{-6}x^5$$

$$y_3 = f_3(x) = -135{,}066 - 23{,}452x - 1{,}398x^2 - 0{,}041922 \cdot x^3 - 6{,}183 \cdot 10^{-4}x^4 - 3{,}571 \cdot 10^{-6}x^5$$

$$y_4 = f_4(x) = 17{,}312 - 2{,}002x - 0{,}213x^2 - 1{,}355 \cdot 10^{-2}x^3 - 4{,}022 \cdot 10^{-4}x^4 - 4{,}386 \cdot 10^{-6}x^5$$

FIG. 7a shows two domains of definition $D_1$ and $D_2$ for the first quadrant for the x-values; and for the second quadrant two mope domains of definition for the x-values, namely $D_3$ and $D_4$.

For the first quadrant, this means that the ideal path of movement $f_a(x)$ cannot be represented by one single function, but is sub-divided into two sections, namely the section disposed closer to the zero point with the domain of definition $D_1$ in the form of the curve $f_{a6}(x)$ and the section, disposed somewhat further away, for the domain of definition $D_2$ with the curve $f_{a7}(x)$.

The same applies to the second quadrant. There too, the ideal curve $f_b(x)$ for the front edge 7' of the anvil a is sub-divided into two partial curves, namely that close to the zero point in the domain of definition $D_3$ for the x-values and that which is somewhat further away from the Y-axis in the domain of definition $D_4$ for the function $f_{a9}(x)$.

Expressed concretely as numbers, for the first quadrant:

$$f_{a6}(x) = -8{,}7013 + 14{,}224x - 3{,}4512x^2 + 0{,}40883x^3 - 0{,}017696x^4.$$

The outer branch of the curve which reaches in as far as the start of the fold region is then defined by the following curve:

$$f_{a7}(x) = 10{,}216 + 1{,}5685x - 0{,}046046x^2 + 0{,}68195 \cdot 10^{-3}x^3 - 0{,}39415 \cdot 10^5x^4.$$

For the second quadrant the same is true:

$$f_{a8}(x) = -8{,}7013 - 14{,}224x - 3{,}4512x^2 - 0{,}40883x^3 - 0{,}017696x^4$$

and for the outer branch of the curve:

$$f_{a9}(x) = 10{,}216 - 1{,}5685x - 0{,}046046x^2 - 0{,}68195 \cdot 10^{-3}x^3 - 0{,}39415 \cdot 10^{-5}x^4.$$

During operation, a pack 1 is conveyed in the direction of the X-axis into a position shown in FIG. 1 (the central pack), wherein the folding metal sheet b and the anvil a ape still in their outer positions of rest.

Whilst the pack 1 is being pushed further in the X-extent, so that its vertical longitudinal central axis 22' comes to lie in the Y-Z-plane, the front edges 7 and 7' of the folding metal sheet b and of the anvil a move towards the upper fold edge of the bottom fold regions of the pack 1, which passes through the upper apex 4 of the triangle parallel to the junction fold line 2. At this moment, the folding operation begins by pressing together by the fold members b and a which are to be moved together. The point 4 of the tip of the gable of the gable region 3 moves downwardly in the Y-Z-axis, whilst the junction fold line 2 is held by the centering bars 25 in the way shown in FIGS. 4 to 6. This folding in operation is continued until the position in FIG. 2 is reached. However, this is only an intermediate position. The point 4 moves further downwardly in the Y-Z-plane until the end fold position in FIG. 3 is reached.

In the meantime, the sonotrode 21 has moved on another path of movement by virtue of the parallelogram gear system 17, 20 into the position shown in FIG. 3, and shortly afterwards the double cardboard strip of the pack at the top is clamped between the front edge 21 of the sonotrode and companion surface of the anvil a and welded. This produces the transverse sealing seam 5. The front edges 7 and 7' of the folding metal sheet b and anvil a then move on the curves $f_a(x)$ and $f_b(x)$, and the pack 1' reaches the position shown to the right in FIG. 1 whence it is conveyed further away.

Figure 8:
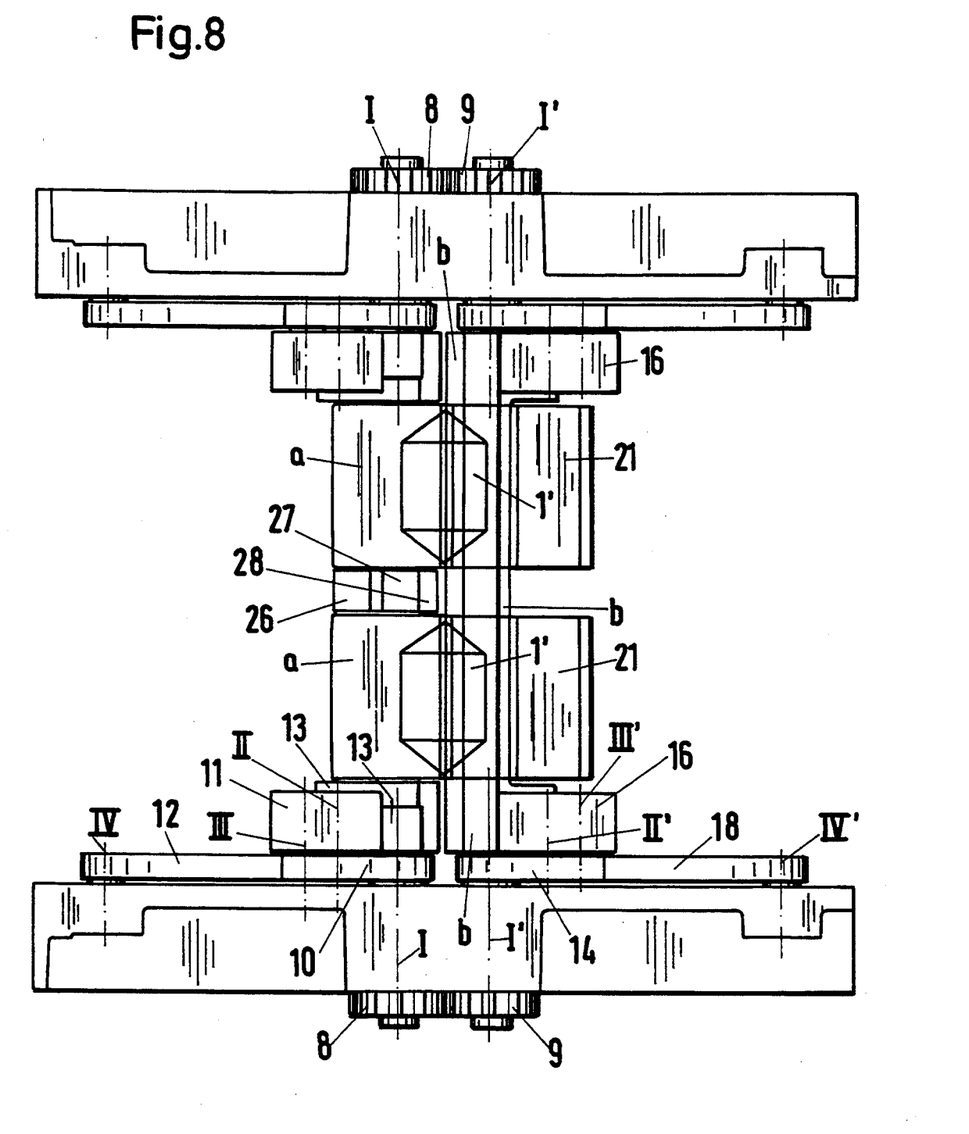
FIG. 8 is a plan view of the folding in device, wherein, however, only the parts important to its understanding are shown.

It is also possible to move two rows of packs simultaneously in the direction of the X-axis into the folding in position if two folding metal sheets b and two anvils a are arranged behind each other in the Z-extent, as shown by the plan view of the apparatus in FIG. 8. In that drawing it is possible to see the above-described components and axes accordingly. Therein, it will be appreciated that the anvils a are held by support shafts 26, 27 and 28.

The various positions of movement of the fold guide rod 12, of the guide lever 17, of the fold guide rod 18, of the connecting levers 11 and 16 etc. are shown in FIGS. 1 to 3.

I claim:

1. An apparatus for folding in the front face of a pack made of cardboard material coated with plastics material, the front face of which pack when folded in is substantially quadrangular in plan view and has a transverse sealing seam which can be folded over, the apparatus having a fold member and a companion fold member which are both driven movably along specific paths of movement by means of at least one lever mechanism and amongst which a conveyor is arranged at a spacing away in an extent of a Y-axis, which conveyor moves the packs in an extent of an X-axis, wherein the Y-axis is vertical to the X-axis and a zero-point of the X- and Y-axes is disposed in an end fold position of the fold member and the companion fold member, characterised in that:

a Y-Z-plane extending in a Z-extent is disposed on the Y-axis and is intersected vertically by the X-axis, that the paths of movement of the fold member and the companion fold member extend symmetrically to each other relative to the Y-Z-plane, wherein the paths of movement in the X-Y-plane are described as a superposing of a translatory movement and a rotational movement of the fold member and the companion fold member, that the fold member and the companion fold member are each fixed to at least one connecting lever which is driven in controlled fashion, that arranged symmetrically to the zero point of the X- and Y-axes is a centering device (25) for the pack, that the space for the apparatus is free of structural members over the centering device, and that each path of movement in an initial region extends at an angle of less than 45° relative to the X-axis, and extends in an end region at an angle of more than 45° relative to the X-axis, such that each path of movement has a continuous transition between the initial region and the end region.

2. An apparatus according to claim 1, characterised in that each path of movement in the initial region extends at an angle of less than 30° relative to the X-axis, and extends in the end region at an angle of more than 60° relative to the X-axis.

3. An apparatus according to claim 1, characterised in that the fold member extends at the front so that it tapers in its cross-section into the shape of a panel, and that the companion fold member is in the form of an anvil against which a sonotrode is adapted to be pressed.

4. An apparatus according to claim 1 characterised in that the path of movement of the fold member in the first quadrant of the X-Y-plane ($x>0$, $y>0$) extends in a region of flatness which is additionally defined by the curves:

$$y_1 = f_1(x)$$

$$y_2 = f_2(x)$$

with $$f_1(x) = a_1 + b_1 x - c_1 x^2 + d_1 x^3 - e_1 x^4 + g_1 x^5$$

and $$f_2(x) = a_2 + b_2 x - c_2 x^2 + d_2 x^3 - e_2 x^4 g_2 x^5$$

and the path of movement of the companion fold member in the second quadrant of the X-Y-plane ($x<0$, $y>0$) extends in a region of flatness which is defined additionally by the curves $$f_3(x) = a_1 + b_1 x - c_1 x^2 - d_1 x^3 - e_1 x^4 + g_1 x^5$$

$$f_4(x) = +a_2 - b_2 x - c_2 x^2 - d_2 x^3 - e_2 x^4 + g_2 x^5$$

wherein
$a_1 = -135,006$
$b_1 = +23,452$
$c_1 = +1,398$
$d_1 = +0,041922$
$e_1 = +6,183 \times 10^{-4}$
$g_1 = +3,571 \times 10^{-6}$
$a_2 = +17,312$
$b_2 = +2,002$
$c_2 = +0,213$
$d_2 = +1,355 \times 10^{-2}$
$e_2 = +4,022 \times 10^{-4}$
$g_2 = +4,386 \times 10^{-6}$.

5. An apparatus according to claims 1 characterised in that the path of movement of the fold member is described by the curve $$y_{a6} = f_{a6}(x)$$

with $$f_{a6}(x) = a_3 + b_3 x - c_3 x^2 + d_3 x^3 - e_3 x^4$$

for $D_1\{x/0 \leq x \leq 6\}$ $$y_{a7} = f_{a7}(x)$$

with $$f_{a7}(x) = a_4 + b_4 x - c_4 x^2 + d_4 x^3 - e_4 x^4$$

and the path of movement of the companion fold member is described by the curve $$f_{a8}(x) = -a_3 - b_3 x - c_3 x^2 - d_3 x^3 - e_3 x^4$$

for $D_3\{x/-6 \leq x \leq -0\}$ $$f_{a9}(x) = a_4 - b_4 x - c_4 x^2 - d_4 x^3 - e_4 x^4$$

for $D_4\{x/-40 \leq x \leq -6\}$ wherein
$a_3 = 8,7013$
$b_3 = 14,224$
$c_3 = 3,4512$
$d_3 = 0,40883$
$e_3 = 0,017696$
$a_4 = 10,216$
$b_4 = 1,5685$
$c_4 = 0,046046$
$d_4 = 0,68195 \times 10^{-3}$
$e_4 = 0,39415 \times 10^{-5}$.

6. An apparatus according to claim 3, characterised in that the sonotrode is adapted to be pressed against the anvil in a path of movement different from the path of movement of the fold member.

7. An apparatus according to claim 1, characterised in that the centering device has two parallel centering bars which are at a spacing apart and which extend in the direction of conveyance of the pack, wherein the spacing between them is measured in the Z-extent.

8. An apparatus for folding in the front face of a pack made of cardboard material coated with plastics material, the front face of which pack when folded in is substantially quadrangular in a plan view and has a transverse sealing seam which can be folded over, the apparatus having a fold member and a companion fold member which are both driven movably along specific paths of movement by means of at least one lever mechanism and amongst which a conveyor is arranged at a spacing away in an extent of a Y-axis, which conveyor moves the packs in an extent of an X-axis, wherein the Y-axis is vertical to the X-axis and a zero-point of the X- and Y-axes is disposed in an end fold position of the fold member and the companion fold member, characterised in that:

a Y-Z-plane extending in a Z-extent is disposed on the Y-axis and is intersected vertically by the X-axis, that the paths of movement of the fold member and the companion fold member extend symmetrically to each other relative to the Y-Z-plane, wherein the paths of movement in the X-Y-plane are described as a superposing of a translatory movement and a rotational movement of the fold member and the companion fold member, that the fold member and the companion fold member are each fixed to at least one connecting lever which is driven in controlled fashion, that arranged symmetrically to the zero point of the X- and Y-axes is a centering device for the pack, and that the space for the apparatus is free of structural members over the centering device, further character lead in that the centering device has two parallel centering bars which are at a spacing apart and which extend in the direction of conveyance in the direction of the X-axis of the pack, wherein the spacing between the centering bars is measured in the Z-extent and the ratio of the spacing between the centering bars and the width of the pack in the Z-extent is 0.95.

9. An apparatus according to claim 1, characterised in that the connecting lever of the companion fold member is connected at a first point of rotation to one end of an output fold guide rod which is mounted at the opposite end at a stationary point of rotation and is connected to a drive cam at a second point of rotation, the drive cam being secured to a toothed output wheel of the other connecting lever such that the Y-Z-plane is vertical to the connecting line of the points of rotation of the toothed wheel.

10. An apparatus for folding in the front face of a pack made of cardboard material coated with plastics material, the front face of which pack when folded in is substantially quadrangular in a plan view and has a transverse sealing seam which can be folded over, the apparatus having a fold member and a companion fold member which are both driven movably along specific paths of movement by means of at least one lever mechanism and amongst which a conveyor is arranged at a spacing away in an extent of a Y-axis, which conveyor moves the packs in an extent of an X-axis, wherein the Y-axis is vertical to the X-axis and a zero-point of the X- and Y-axes is disposed in an end fold position of the fold member and the companion fold member, characterised in that:

a Y-Z-plane extending in a Z-extent is disposed on the Y-axis and is intersected vertically by the X-axis, that the paths of movement of the fold member and the companion fold member extend symmetrically to each other relative to the Y-Z-plane, wherein the paths of movement in the X-Y-plane are described as a superposing of a translatory movement and a rotational movement of the fold member and the companion fold member, that the fold member and the companion fold member are each fixed to at least one connecting lever which is driven in controlled fashion, that arranged symmetrically to the zero point of the X- and Y-axes is a centering device for the pack, and that the space for the apparatus is free of structural members over the centering device, further characterised in that the length of each path of movement in the extent of the X-axis is somewhat bigger than or equal to half the length of a bottom of the pack in the extent of the X-axis.

* * * * *